Feb. 10, 1942.  O. P. HAEGELE  2,272,702
CUTTING MACHINE
Filed Jan. 12, 1940  4 Sheets-Sheet 3
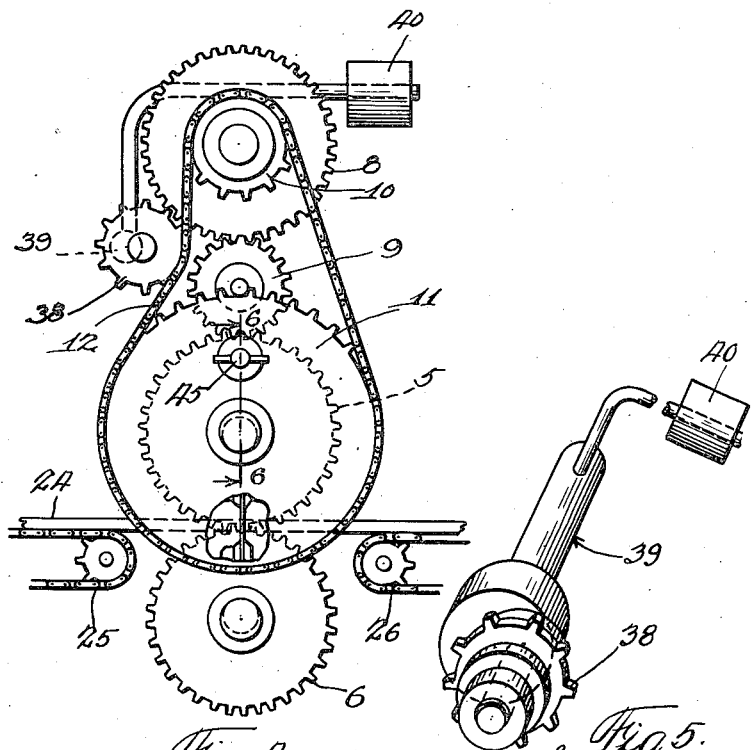
Fig. 4.
Fig. 5.
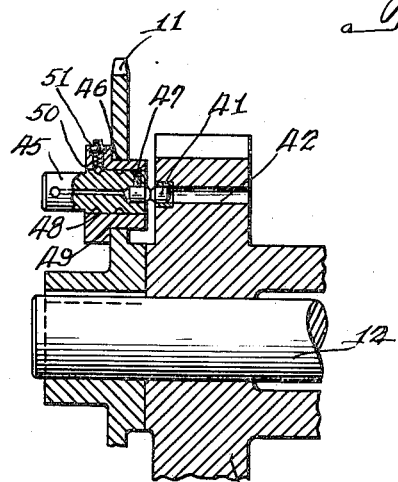
Fig. 6.
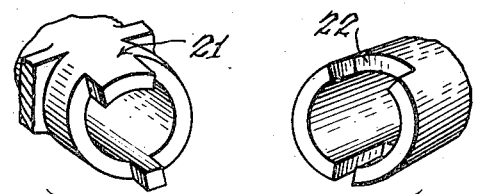
Fig. 7.
Inventor
Otto P. Haegele.
By Ams, Thiess, Olsen & Mecklenburg
Attys.

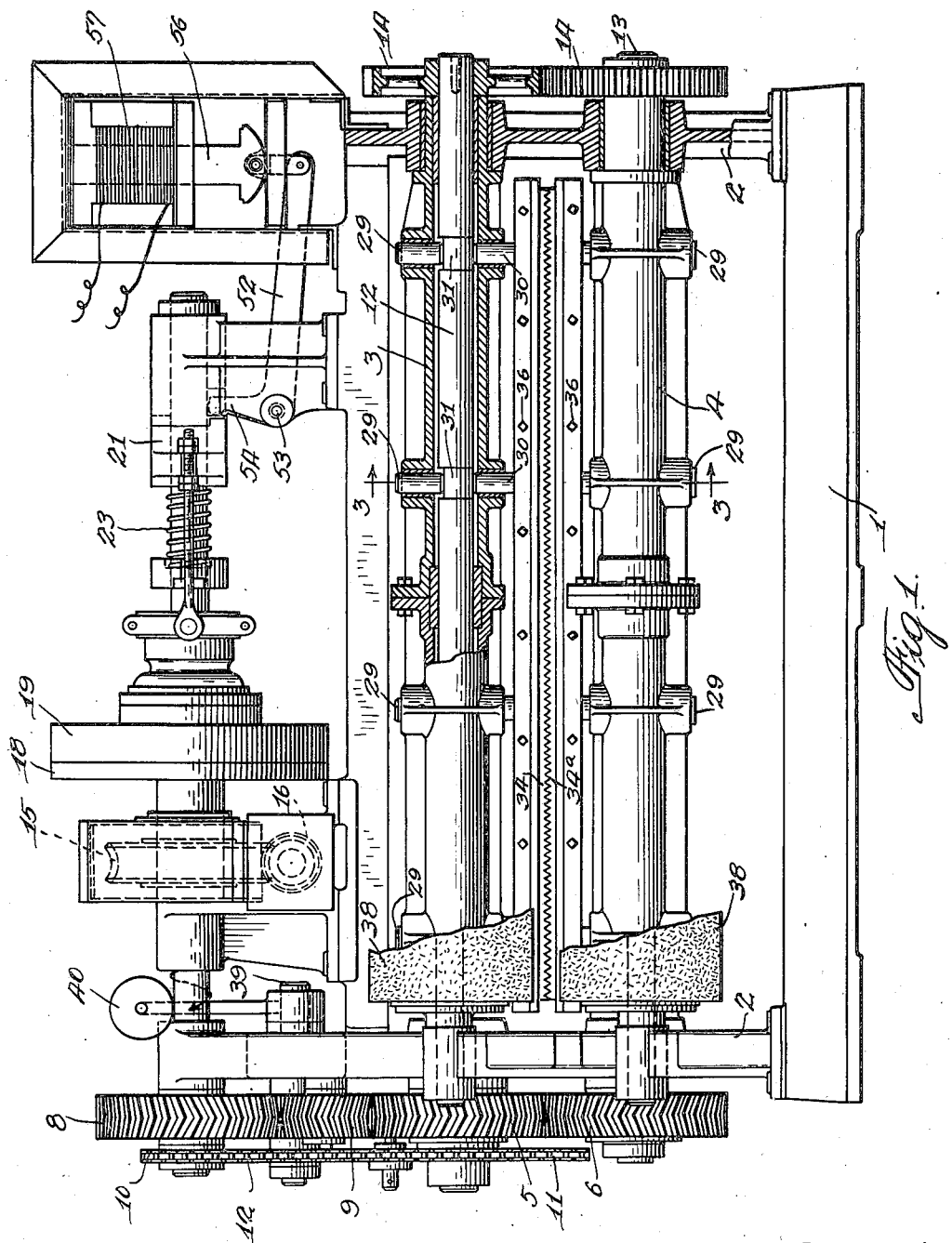

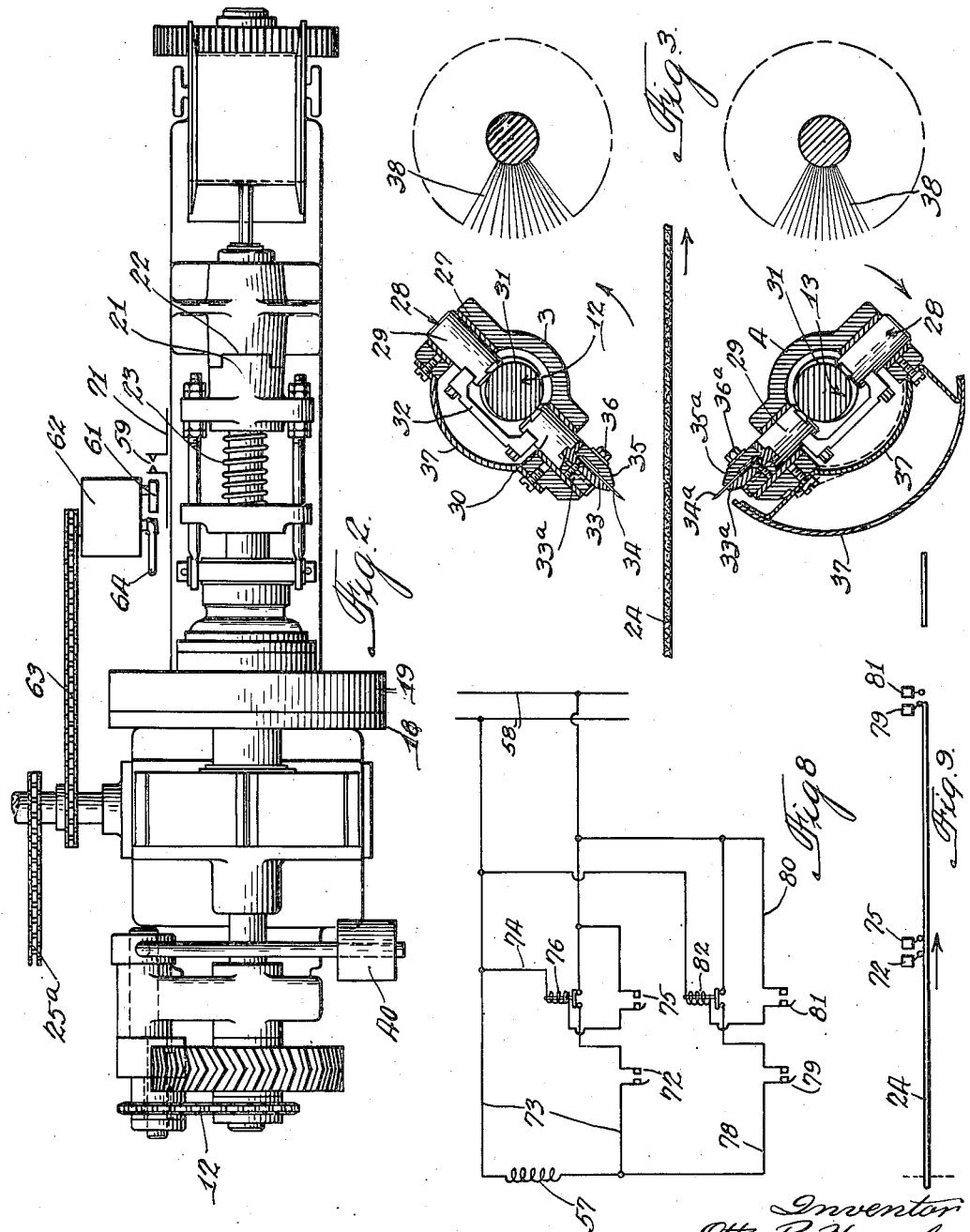

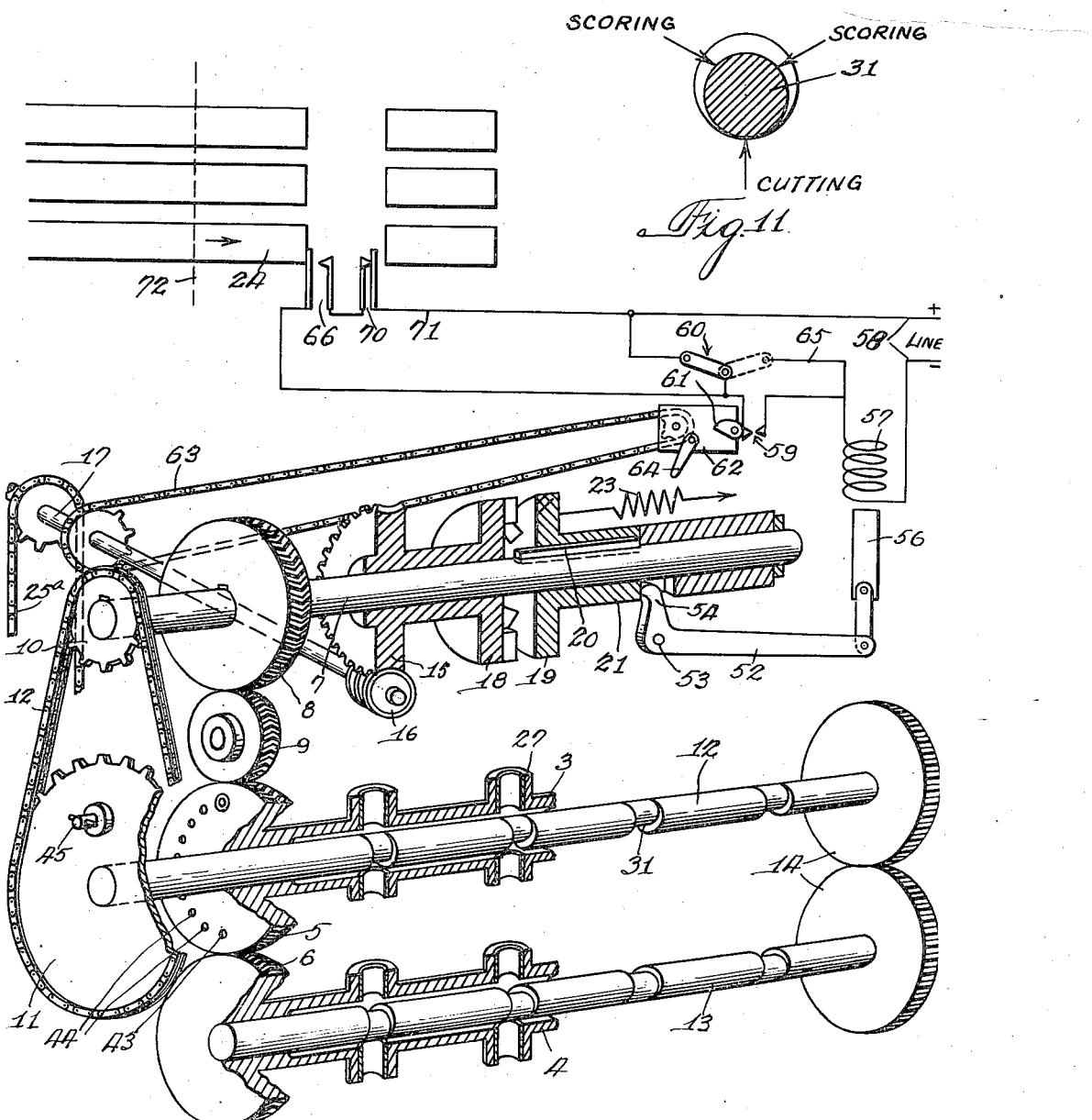

UNITED STATES PATENT OFFICE 2,272,702

CUTTING MACHINE

Otto P. Haegele, Chicago, Ill., assignor to United States Gypsum Company, Chicago, Ill., a corporation of Illinois Application January 12, 1940, Serial No. 313,545

20 Claims. (Cl. 164—68)

This invention relates to a web cutting and scoring device adaptable for various uses, and especially useful in connection with the manufacture of plaster board and the like.

The particular embodiment illustrated and described herein comprises an automatic machine for cutting a moving web into predetermined lengths, or for performing cutting and scoring operations in predetermined relationship, such, for instance, as alternately, whereby a predetermined length of the web may be scored intermediate the cut ends.

The machine is, of course, adaptable for cutting and scoring any suitable type of sheet material. However, it is particularly adapted for use in connection with the manufacture of building boards having a plaster base and commonly known to the trade as plaster board. In the manufacture of wallboard or plaster board of this type, the boards are usually formed in a continuous web, covered on both sides with paper. The web is carried by a suitable conveyer through a cutting mechanism which severs the web to form boards of any predetermined length while they are still in the moist state. The boards are then conveyed to a drying chamber from which they are removed and packed for shipment.

The finished boards are of various lengths, widths, and thicknesses. For instance, boards commonly used to support plaster are usually formed in continuous strips three-eighths of an inch thick and 16 inches wide, and cut either 32 inches or 48 inches long in order to conform with the spacing of studding or similar supports used in building operations. Other standard wallboards are commonly made with a gypsum base, and are usually either 32 inches or 42 inches wide and from 4 to 12 feet in length, and may ordinarily be from ¼ to ½ inch in thickness. The boards are manufactured in one or more continuous webs or strips which are simultaneously horizontally movable on the conveyer, and therefore a plurality of strips may be cut, or cut and/or scored simultaneously.

In the manufacture of these wallboards, particularly in the shorter lengths, it is often desirable that each web or strip on the conveyer be alternately cut and scored for convenience in handling during future operations. By this means at least two boards may be handled as a unit and broken apart after removal from the dryer.

It is an object of the invention to provide a simple and efficient mechanism co-operating with the usual wallboard web conveyer, whereby strips or webs thereon may alternately be cut and scored in accordance with the predetermined length of finished board desired.

In the usual method of cutting or scoring wallboard, the machine is provided with a comparatively large drum rotatable above the conveyer and provided with knives which are spaced on the periphery of the drum in accordance with the desired length of the wallboards to be cut. This in many instances requires an extremely large drum, and it is often necessary to provide a number of interchangeable drums in order to meet the requirements of various wallboard lengths.

It is an object of the present invention to provide a cutting and scoring device so constructed that a very small diameter knife support may be provided and in which it is only necessary to provide a short radius single knife-edge on the support, and in which the same support and knife may be used for cutting and/or scoring wallboards of any predetermined length.

A further object is the provision of a machine of the character described which will cut or score a web, such as plaster board or the like, from each side toward the central plane of the web. This is desirable, in that it eliminates tearing of the paper cover and distortion of the cut edge of the board.

Another object is the provision of a machine of the character described in which the same machine and the same cutter elements may be used either for cutting the web into predetermined lengths or for alternately cutting and scoring, and also, if desired, the plaster board strips may consecutively be scored to length and also in which the scoring may be accomplished to any desired depth, and the depth of scoring may be controlled by means of a simple manual adjustment.

It is a further object to provide an automatic machine of the character described in which the cutting operations may be electrically controlled to cut or score, or both, in a manner to provide finished boards of any predetermined length.

Another object is to provide an electrical control for a cutting and scoring machine in which all operations may automatically be controlled by the moving web.

Further objects will be apparent from the specification and the appended claims.

In the drawings:

Figure 1 is a front elevation of a machine illustrating one embodiment of the invention;

Fig. 2 is a top view of the embodiment illustrated in Fig. 1;

Fig. 3 is a transverse sectional view through the cutting and scoring devices, and is taken on a line substantially corresponding to line 3—3 of Fig. 1;

Fig. 4 is an end elevation of the cutter driving transmission illustrated in Fig. 1;

Fig. 5 is a perspective view of the chain tightening device shown in Figs. 1 and 4;

Fig. 6 is a vertical sectional view through the shear pin sprocket locking mechanism, and is taken on a line substantially corresponding to line 6 of Fig. 4;

Fig. 7 is an exploded perspective view of a portion of the electrical control clutch mechanism shown in Figs. 1 and 2, and which is adapted to prevent more than one revolution of the cutting and scoring knives at one time;

Fig. 8 is a wiring diagram of one type of an electrical control for the cutting mechanism;

Fig. 9 is a diagrammatic view illustrating the relationship of the control switches shown in Fig. 8 to the moving wallboards, and illustrates their normal method of operation;

Fig. 10 is a diagrammatic perspective view of the entire operating mechanism and one type of electrical control therefor; and Fig. 11 is a diagrammatic view of one of the cutter cams and illustrates a method of multiple scoring between severing operations.

Referring to the drawings in detail, the embodiment illustrated comprises a base 1 having vertical end frames 2 on which may be supported all of the operating and controlling mechanisms. The cutting mechanism comprises two parallel tubular rotors or hollow shafts 3 and 4 which are mounted one above the other in suitable bearings in the end frames 2. These hollow shafts 3 and 4 are connected together for simultaneous rotation in opposite directions by means of gears 5 and 6 secured to the ends thereof, as illustrated in Fig. 10. The rotor gear 5 is driven from a horizontal shaft 7 by means of a gear 8 fixed thereon and meshing with an idler 9, the gear ratio being such that the shafts 3 and 4 may intermittently be rotated with the shaft 7 and at the same speed.

The shaft 7 is also provided with a sprocket 10 secured thereto and arranged to drive a sprocket 11 by a chain 12. The driven sprocket 11 is secured to a cam shaft 12, which latter is rotatably mounted in suitable end bearings in the hollow shaft 3 in the manner illustrated in Fig. 6. The cam shaft 12 is arranged to drive a similar cam shaft 13 in the opposite direction and at the same speed by means of the gears 14 secured to the respective cam shafts, the cam shaft 13 being rotatably mounted in the lower hollow shaft 4 in the same manner as previously described with respect to the cam shaft 12.

The sprockets 10 and 11 for driving the cam shafts 12 and 13 are preferably of a two to one ratio so that the cam shafts 12 and 13 perform one revolution for each two revolutions of the hollow shafts 3 and 4. These hollow shafts 3 and 4 may be termed the cutter shafts, and the cam shafts 12 and 13 are provided with suitable cams thereon, which cams are positionable during rotation to alternately advance and retract suitable cutter knives in a manner which will be described later.

The shaft 7 is only intermittently operated to rotate the cutter shafts 3 and 4 and the cam shafts 12 and 13 in accordance with the predetermined length of the boards to be cut. The gear ratio is such that cutter shafts 3 and 4 rotate at the same speed as the shaft 7. Therefore, with each intermittent rotation of the shaft 7 the board will be either cut or scored in accordance with the relative position of the cam shafts 12 and 13, which rotate at only one-half the speed of the hollow cutter shafts.

A worm gear 15 is mounted for free rotation on the shaft 7 and is driven by means of a worm 16 secured to a drive shaft 17. The worm gear 15 is provided with a driving clutch member 18 which is adapted to be engaged by a driven clutch member 19, the latter being slidably mounted on the shaft 7 by means of a feather key 20. The sleeve of the driven clutch member 19 is provided at its opposite end with a wide clutch tooth 21 (Figs. 2 and 7) which is normally retained in engagement in a suitable wide notch 22 in the fixed frame of the machine by means of a spring 23. In this position of the clutch portion 21 the driving member 19 is out of engagement with the driven member 18 and the shaft 7 is locked against rotation by reason of the clutch member 21 being engaged in the notch 22 of the frame. The clutch member 19 may be disengaged from the frame and engaged with the clutch member 18 to intermittently rotate the shaft 7, by means of an electrical mechanism which will be described later, and which may operate in synchronism with the conveyer and the movement of the web thereon. The clutch operating means may intermittently be controlled by the movement of the web itself, irrespective of any mechanical synchronism with the conveyer.

The finished plaster board strip or strips 24, preferably in their moist condition, are continuously moved between the hollow cutter shafts 3 and 4 by means of a continuously operating conveyer 25 (Fig. 4), which latter may be driven in any suitable manner, but preferably synchronized with the drive shaft 17, from which it may be driven by a chain 25a (Fig. 10) on suitable sprockets. After passing between the cutter shafts, the plaster board is removed by means of a second continuously operating conveyer 26, which also may be operated in any suitable manner, and which preferably travels at a higher speed than the feeding conveyer 25. This higher speed causes prompt separation of the cut plaster boards from the web, and enables the use of certain electrical controls for operating the cutters, which will later be described.

In order to cut and score the plaster board or web as it passes between the cutter shafts, each shaft is provided with suitably spaced transverse bearings 27 in which are mounted reciprocating cam followers 28, each comprising follower portions 29 and 30 on opposite sides of the shaft and having a bearing engagement with a co-operating cam portion 31 of the associated cam shaft 12 or 13, as shown in Fig. 3. The follower portions 29 and 30 are secured together by means of a bridge bar 32. Four cams 31 are provided for upper shaft 12 in the present instance, and a similar follower unit is provided for each cam. Each set of cam follower units 28 supports an elongated knife-holding bar 33 which is secured to each follower by a screw 33a and extends substantially the entire width of the conveyer. A knife 34 having its cutting edge preferably serrated, as shown in Fig. 1, is clamped to the bar 33 by means of an elongated clamping bar 35 secured in clamping relation by means of machine screws 36. A shield 37 may be provided for each opening in the shaft 3 adjacent the cam followers.

The lower cutter shaft 4 is provided with a cutter assembly substantially identical with that just described, and most of the parts may be interchangeable therewith. This lower cutter shaft is provided with a cutter supporting bar 33a against which a serrated knife 34a is secured by means of clamping bar 35a secured by machine screws 36a. The only difference between the operation of the upper and lower cutter assemblies is that the shafts 12 and 13 are in opposed relationship with respect to the cam portions thereon; therefore, when a cutting operation takes place, both the upper and lower knives are simultaneously extended from the cutter shafts so that when the severing movement is complete, the cutting edges of the knives 34 and 34a meet midway of the material to be cut and may therefore completely sever the web.

The lower cutter assembly is provided with an elongated arcuate sheet metal member 37 which is rotatable therewith, and which is positioned to support the web 24 as it passes between the cutters. The cutters of course rotate in the direction of the arrows shown in Fig. 3, and brushes 38, preferably of the freely rotary type, may be mounted adjacent the paths of the cutters so that the cutters are cleaned during each rotation.

As previously stated, these cutter assemblies are made to rotate simultaneously and intermittently in accordance with the length of the panel boards to be cut. Also, as previously stated, the ratio of rotation between the cutter shafts 3 and 4 and the cam shafts 12 and 13 in the embodiment illustrated is two to one. Therefore, the cam shafts 12 and 13 will rotate one-half a revolution for each revolution of the cutter shafts 3 and 4. It will be apparent that during one revolution of a cutter shaft the associated cam shaft will assume a position to extend the corresponding knife for a full cutting movement, and that during the next succeeding revolution of the cutter shaft the cam shaft will assume the opposed position, whereby the cutter is moved to its extreme retracted position for scoring. The upper and lower cutting mechanisms are synchronized in such a manner that the same operations take place in both mechanisms at the same time. Therefore, the plaster boards will alternately be cut and scored.

When it is desired to completely sever the web with each intermittent revolution of the cutter shafts and omit the scoring, it is only necessary to remove the sprocket chain 12 which ordinarily drives the cam shafts 12 and 13, and to then lock the cam shaft sprocket 11 to the gear 5 by means of the shear pin locking arrangement shown in Fig. 6.

The chain 12 is loosely mounted on the sprockets 10 and 11, and is held taut during operation of the machine by means of an idler 38 (Figs. 4 and 5) eccentrically mounted on a shaft 39, which latter is supported in suitable bearings on the frame of the machine. The idler normally is retained in operative position by means of a weight 40 secured thereto. In order to remove the chain it is only necessary to raise the weight 40 which releases the idler from the chain.

The cam shaft sprocket 11 may be secured to the gear 5 by means of a shear pin 41 which is slidably mounted in the sprocket and may removably be inserted in a hole 42 in the gear 5 (Fig. 6). By this means the cam shafts 12 and 13 will be operatively interlocked with the cutter shafts 3 and 4 to rotate simultaneously therewith and at the same speed. The shear pin hole 41 is so positioned in the gear 5 that the relationship of the cams 31 on the cam shafts will retain the cutter knives in their fully extended position.

The gear 5 may, if desired, be provided with a diametrically opposed shear pinhole 43, and the sprocket 11 may be positioned so that the pin 41 may be inserted therein if desired. In this position the cam shafts 12 and 13 will be in an opposed relationship in so far as the cams are concerned, whereby the cutter knives will be completely retracted and only scoring will take place with each revolution of the cutter assemblies. Also, if desired, intermediate holes 44 may be provided on at least one side of the gear 5, so that the depth of the scoring may be varied as required by inserting the locking pin 41 in a corresponding intermediate hole 44.

The shear pin 41 is secured in a manually operable slidable member 45 which is preferably mounted in a suitable bushing 46 in the sprocket 11. The shear pin 41 is secured in the member 45 by means of a setscrew 47. The member 45 is provided with annular grooves 48 and 49 adapted to be engaged by a ball latch 50 urged to latching position by means of a spring 51. When the member 45 is in the position illustrated, the shear pin will be in a position to lock the sprocket 11 in fixed relation to the gear 5, and when the member 45 is pulled outwardly to enable the latch 50 to engage in the groove 49, the shear pin will be released from the gear 5 and the chain may then be replaced on the sprockets and the machine operated as previously described.

As heretofore mentioned, intermittent operation of the machine is controlled by movement of the driven clutch member 19 to intermittently engage with the driving clutch member 18. The mechanism for this purpose comprises a bell crank lever 52 (Figs. 1 and 10) pivoted at 53 and having one end 54 engaging the sleeve of the clutch 19. The opposite end of the lever 52 is connected to the armature 56 of a solenoid 57, whereby when the solenoid is momentarily energized, the resultant operation of the lever 56 will cause the clutch 19 to be released from the fixed frame of the machine and engaged with the driving clutch member 18 to thereby cause one revolution of the cutter members, after which the clutch is immediately released and the clutch member 19 reengaged with the fixed frame by the action of the spring 23.

The solenoid 57 may be energized from any suitable source, such as the main leads 58, and is in series with a normally open switch 59 and a manually operable switch 60, whereby when the switch 59 is closed the solenoid 57 will be energized to cause operation of the machine.

The switch 59 is intermittently closed by means of a cam 61 which is driven through a variable speed mechanism 62 operatively connected to the continuously operating drive shaft 17 by means of a chain 63 on suitable sprockets. The variable speed mechanism 62 may be provided with an adjustable control member 64, whereby the speed of the cam 61 may be synchronized with the speed of the web conveyer to cause any desired intermittent closing of the switch 59 in accordance with a desired timing of the cutting and/or scoring operations. It will be apparent that with each rotation of the cam 61 the driving clutch will be engaged and any desired timing relationship with the conveyer and web thereon may be obtained.

In some cases it is desirable to control the cutting operations solely by the movement of the web itself. This may be accomplished by reversing the manual switch 60 to the position shown by dotted lines, whereby a shunt circuit 65 makes the cam operated switch 59 ineffective and provides a series circuit through a pair of web controlled switches 66 and 70 in the branch circuit 71 and the solenoid 57, as diagrammatically illustrated in Fig. 10. The switch 66 is normally open and the switch 70 is normally closed, as shown. These switches may be operated solely by one of the moving webs 24, and are mounted close together on the frame of the machine, or on any other suitable support, so that they may be positioned relative to the length of that portion of the web to be severed.

In operation, the web is moving in the direction of the arrow, and when the end of the web engages the switch 66 this switch will be closed and the solenoid 57 energized. The end of the web then immediately engages and opens the succeeding series switch 70, so that only one cutting operation is performed substantially at the location indicated by the dotted line 72. As soon as the web is cut, the cut-off portion is rapidly moved out of engagement with the switches 66 and 70 by means of the more rapidly moving conveyer 26 (Fig. 4). This provides a sufficient space between the end of the web and the cut-off portion to enable the switches 66 and 70 to return to their normal condition for a succeeding operation.

The circuit arrangement involving the branch circuit 71 and switches 66 and 70 is used only for cutting the web into predetermined lengths. Alternate cutting and scoring may also be accomplished solely by the movement of the web operating in connection with the electrical circuit disclosed in Fig. 8. This comprises a normally open switch 72 in series with the solenoid 57 in a branch circuit 73 connected to the main line 58. A shunt circuit 74 is provided across the switch 72 and solenoid 57, having a second normally open switch 75 therein in series with an electrical switch 76, which latter is adapted, when energized by closing the switch 75, to break the solenoid circuit 73. A second branch circuit 78 is provided with an open switch 79 in series with the solenoid 57, and a second shunt circuit 80 is provided around switch 79 and solenoid 57 and is provided with a normally open switch 81 in series in the shunt circuit with an electrical switch 82, which latter is adapted, when energized by closing switch 81, to break the solenoid circuit 78. The operation of the branch circuit 73 and associated controls is identical with the operation of the branch circuit 78 and its controls in so far as the electrical devices therein are concerned.

In operation, the switches 72 and 75 are positioned relative to the web in substantially the same manner as the switches 66 and 70, previously described and illustrated in Fig. 10, and operate in substantially the same manner to first energize the solenoid 57 to cause a single operation of the cutters, and then break the circuit to make the solenoid ineffective until the web has traveled the required distance for another operation of the cutters. The pair of switches 79 and 81 are adjustably mounted on the frame of the machine or other suitable support in spaced relation to the switches 72 and 75, and the adjustment of the position of these pairs of switches relative to each other determines the distance between alternate cuts and scores in the web as it passes through the machine. The double length board that is scored and cut from the web is received on the rapidly moving discharge conveyer 26, so that it is rapidly spaced from the web sufficiently to allow the first set of switches 72 and 75 to again operate in the previously described manner. Fig. 9 illustrates the approximate relative positioning of the pairs of switches relative to the web.

As previously indicated, it is sometimes desirable to perform multiple scoring between severing operations. This may be accomplished by changing the sprocket ratios of the cam shaft drive so that the relationship of cam shaft rotation to cutter shaft rotation is in accordance with the multiple scoring requirements. For instance, if the cam shafts 12 and 13 are operated at one-third the speed of the cutter shafts 3 and 4, two scoring operations will take place between each cutting operation and the web will be scored in lengths which are multiples of the lengths of the severed strips. The diameter of the cam and its configuration may easily be determined to provide the desired depth of scoring cut.

Modifications may be made without departing from the spirit of the invention, and it is therefore desired that the invention be limited only by the prior art and the scope of the appended claims.

Having thus described this invention, what is claimed and desired to be secured by Letters Patent is:

1. In an automatic web cutting device, means for moving said web, a transverse shaft adjacent said web, a longitudinal cutter on said shaft and having a cutting edge substantially parallel to the axis of said shaft and in cutting relation to said web, and means to cause said cutting edge to rotate around said axis in a substantially eccentric rotating path.

2. In an automatic web cutting device, means for moving said web, a transverse shaft adjacent said web, a longitudinal cutter on said shaft and having a cutting edge substantially parallel to the axis of said shaft and in cutting relation to said web, means to cause said cutting edge to rotate around said axis in a rotating substantially eccentric path, and transmission mechanism to synchronize the eccentric operating relationship of said cutting edge relative to the rotation of said shaft to thereby vary the depth of cut during successive rotations of said shaft.

3. A device for cutting a moving plaster board web comprising a pair of knives mounted for bodily rotation around respective parallel fixed axes between which said web moves, means to rotate said knives to cut from opposite sides of said web to either sever or score said web, cam means operatively associated with said knives to vary the depth of cut during successive rotations, and automatic means to synchronize the movement of said cam means and the rotation of said knives to vary the depth of cut in successive operations.

4. An automatic plaster board cutting machine comprising a single pair of knives bodily rotatable around respective parallel axes, means for continuously moving said web therebetween whereby said knives cut from opposite sides thereof to sever or score said web, means to intermittently rotate said knives in synchronism with the continuous movement of said web to sever said web into lengths which are multiples of predetermined plaster board lengths, and means to cause said knives to score said web lengths in accordance with said predetermined board lengths.

5. An automatic plaster board cutting machine comprising a single pair of knives bodily rotatable around respective parallel axes, means for continuously moving said web therebetween whereby said knives cut from opposite sides thereof to sever or score said web, means to intermittently rotate said knives in synchronism with the continuous movement of said web to sever said web into lengths which are multiples of predetermined plaster board lengths, means to cause said knives to score said web lengths in accordance with said predetermined board lengths, and adjustable means to vary said web lengths and simultaneously vary said board lengths.

6. A plaster board cutting machine comprising means for moving a plaster board web in a horizontal plane between two closely adjacent hollow shafts geared together for simultaneous rotation in opposite directions at the same speed, a longitudinal knife on each shaft and mounted for reciprocation toward and from the respective axes, a cam shaft in each hollow shaft and geared together for simultaneous rotation at the same speed and each co-operating with a respective knife to simultaneously extend and retract said knives during each revolution of said hollow shafts to thereby cut said web to varying depths on each side during successive rotations of said hollow shafts, a transmission adapted to synchronize the rotation of said hollow shafts and said cam shafts to cause predetermined variations in the depth of cut, and means to adjust said transmission to cause consecutive cuts of the same depth.

7. In a plaster web cutting machine, the combination with cutters intermittently operable to cut said web into plaster boards, and a continuously moving web, of electrically operated means for controlling the intermittent operation of said cutters and including an electrical circuit having a normally open switch and a normally closed switch therein, said switches being positioned for related operation by said moving web to cause intermittent operation of said cutters in accordance with predetermined lengths to be cut.

8. In a plaster web cutting machine, the combination with cutters intermittently operable to cut said web into lengths and score said web lengths into board lengths, of electrically operated means for controlling the intermittent operation of said cutters and including an electrical circuit having a plurality of spaced pairs of switches therein, each pair comprising a normally open and a normally closed switch, said switches being positioned for related operation by said moving web to cause intermittent operation of said cutters to cut said web into lengths and to score said web lengths into predetermined board lengths.

9. In an automatic web cutting device having means for conveying an uncut web, intermittently operable means to sever said web, means to alternately position said severing means during intermittent operation thereof to alternately sever and score said web, and electrical means intermittently operable by said web to control and time the intermittent operation of said severing and scoring means relative to the movement of said web.

10. In an automatic web cutting device having means for conveying an uncut web, intermittently operable means to sever said web, means to alternately position said severing means during intermittent operation thereof to alternately sever and score said web, electrical means intermittently operable by said web to control and time the intermittent operation of said severing and scoring means relative to the movement of said web, and manually adjustable means to cause said device to completely sever said web with each intermittent operation.

11. In an automatic web cutting device, a web severing means, mechanism for causing intermittent operation of said severing means to cut said web from both sides toward the middle into predetermined lengths, means to enable operation of said mechanism to cause said severing means to sever and score said web during successive intermittent operations, and electrical means operatively related to said mechanism to control and time said successive operations in predetermined relation to the movement of said web.

12. An automatic web cutting device comprising means for conveying an uncut web and a single pair of oppositely disposed cutters, one cutter on each side of said web, transmission means to rotate each cutter around an axis transverse to the web, means to oscillate each cutter transversely of its axis, and means to synchronize and rotarily position the oscillating movement of said cutters with the rotatable movement thereof to alternately sever and score said web by simultaneously cutting from both sides thereof toward the middle.

13. In an automatic web cutting device, an elongated cutter adjacent a surface of a web, means to rotate said cutter about an axis parallel with the cutting edge thereof to cut said web, means to intermittently extend and retract said cutter to cut said web a predetermined maximum depth during each rotation of said cutter, and means to limit the extended position of said cutter during predetermined cutting operations so that selected cuts of a series are less than said maximum depth.

14. In an automatic web cutting device, a pair of rotatable members in opposed relation with respect to the plane of said web, means to simultaneously rotate said members at the same speed, cutters on said members operable to co-operate in opposed cutting relation to cut said web to a predetermined depth to thereby sever said web, means to intermittently extend and retract at least one of said cutters with respect to its axis of rotation, and means to limit the extended position of said last mentioned cutter during predetermined cutting operations to less than said maximum depth.

15. In an automatic web cutting device, a pair of rotatable members in opposed relation with respect to the plane of said web, at least one cutter on each member to cut each side of a web passed therebetween, and means to intermittently extend and retract said cutters with respect to their axes of rotation, said last means being operatively related to said cutters and constructed to cause maximum extension at different rotative positions thereof to vary the depth of predetermined successive cuts.

16. In an automatic machine for cutting wallboard web, a pair of knives mounted for bodily rotation around respective parallel axes between which said web moves, means to rotate said knives to cut from opposite sides of said web to either sever or score said web, means to extend and retract one of said knives during its rotation, said last means being operative to cause maximum extension of said knife at different rotative positions thereof during successive rotations to thereby vary the depth of successive cuts.

17. In an automatic web cutting device, the combination with a conveyor for moving an uncut web having a web cutting means closely associated therewith and a transmission for operating said cutting means to intermittently cut said web, of means to intermittently vary the cutting relationship of said cutting means to said web to alternately sever and score said web, and control means operable by said web to control the operation of said transmission.

18. In an automatic web cutting device, the combination with a conveyor for moving an uncut web having a web cutting means closely associated therewith and a transmission for operating said cutting means to intermittently cut said web, of means to intermittently vary the cutting relationship of said cutting means to said web to alternately sever and score said web, and control means operable by said web to control the operation of said transmission, said control means being presettable relative to said web to predetermine the distance between cuts in said web.

19. In a machine for cutting continuously moving plaster board web into sections of predetermined length, a transverse cutter on each side of said web, means to intermittently bodily rotate each cutter around a fixed axis to simultaneously cut said web, means automatically controlled in accordance with a predetermined movement of said web to cause a single rotation of said cutters to sever said web, and means to cause at least one intermediate revolution between consecutive severing revolutions and to simultaneously change the rotary path of at least one of said cutters to score said web.

20. In an automatic web cutting machine having a conveyor for continuously moving an uncut web, a transverse cutter on each side of said web, each cutter being bodily rotatable around a respective fixed axis, a transmission for intermittently rotating said cutters to cut said web from opposite sides thereof and automatic means to intermittently change the path of at least one of said cutters relative to its fixed axis to alternately sever and score said web with the same cutting edges.

OTTO P. HAEGELE.